United States Patent
Geibel et al.

(10) Patent No.: US 9,764,259 B2
(45) Date of Patent: Sep. 19, 2017

(54) GROUT SUPPORT INSTALLATION METHOD FOR FILTER UNDERDRAIN SYSTEM

(71) Applicant: Xylem Water Solutions Zelienople LLC, Zelienople, PA (US)

(72) Inventors: John L. Geibel, Butler, PA (US); Brian J. Bates, Bridgenorth (CA)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 0 days.

(21) Appl. No.: 14/568,774

(22) Filed: Dec. 12, 2014

(65) Prior Publication Data

US 2015/0190737 A1 Jul. 9, 2015

Related U.S. Application Data

(60) Provisional application No. 61/915,120, filed on Dec. 12, 2013.

(51) Int. Cl.
*B01D 24/24* (2006.01)
*B01D 24/42* (2006.01)

(52) U.S. Cl.
CPC .............. *B01D 24/24* (2013.01); *B01D 24/42* (2013.01); *Y10T 29/49826* (2015.01)

(58) Field of Classification Search
CPC ........ B01D 24/12; B01D 24/10; B01D 24/02; B01D 23/10–23/18; B01D 24/001; B01D 39/00; B01D 24/00; B01D 24/24; B01D 24/007; B01D 24/42
See application file for complete search history.

(56) References Cited

U.S. PATENT DOCUMENTS

| | | | |
|---|---|---|---|
| 1,365,753 A * | 1/1921 | Vought | B28B 7/183 249/112 |
| 1,805,667 A | 5/1931 | Jenks | |
| 2,648,439 A | 8/1953 | Miller, Jr. | |
| 2,716,490 A * | 8/1955 | Barstow | B01D 23/16 210/277 |
| 2,900,083 A | 8/1959 | Oliver | |
| 3,110,667 A | 11/1963 | Stuppy | |
| 3,322,284 A | 5/1967 | Moore | |
| 3,615,019 A | 10/1971 | Early, Jr. | |
| 3,772,835 A | 11/1973 | Cox et al. | |
| 3,802,144 A | 4/1974 | Spica | |
| 4,702,048 A | 10/1987 | Millman | |
| 5,540,524 A | 7/1996 | Gonsalves | |
| 6,110,366 A | 8/2000 | Hunkele et al. | |
| 6,190,568 B1 * | 2/2001 | Hunkele | B01D 24/24 210/293 |
| 7,685,789 B2 | 3/2010 | Houben | |
| 8,052,870 B2 | 11/2011 | Roberts et al. | |
| 8,177,970 B2 | 5/2012 | Bradley et al. | |
| 8,343,343 B2 | 1/2013 | Kadakia et al. | |
| 8,357,295 B2 | 1/2013 | Geibel | |
| 8,409,437 B2 | 4/2013 | Roberts et al. | |

(Continued)

*Primary Examiner* — David C Mellon
*Assistant Examiner* — Liam Royce
(74) *Attorney, Agent, or Firm* — The Webb Law Firm

(57) ABSTRACT

A method of installing a filter underdrain system includes: positioning a grout pad on a filter floor; positioning an underdrain block onto the grout pad such that the grout pad is displaced when the underdrain block is positioned on the grout pad; and inserting filler grout around the underdrain block.

11 Claims, 10 Drawing Sheets

(56) References Cited

U.S. PATENT DOCUMENTS

2010/0314305 A1* 12/2010 Kadakia ............... E03F 1/005
  210/163
2011/0174719 A1    7/2011 Berkebile et al.
2012/0048793 A1    3/2012 Roberts et al.
2013/0199990 A1    8/2013 Berkebile et al.

* cited by examiner

GROUT SUPPORT INSTALLATION METHOD FOR FILTER UNDERDRAIN SYSTEM

CROSS-REFERENCE TO RELATED APPLICATIONS

This application claims priority to U.S. Provisional Application No. 61/915,120 filed on Dec. 12, 2013, the disclosure of which is hereby incorporated in its entirety by reference.

BACKGROUND OF THE INVENTION

Field of the Invention

The present disclosure relates generally to a method of installing a filter system for filtering a liquid containing particles, and, more particularly, to a grout support installation method for a filter underdrain system.

Description of Related Art

Typical gravity or pressure filters use some type of filter media that captures the dirt particles from a liquid being filtered as the liquid passes through the media to an underdrain or collection system. Generally, beneath the filter media is a series of underdrain laterals consisting of underdrain laterals that are attached to the filter floor. When installing a filter underdrain system, the underdrain must be installed level and have a restraining system to prevent it from moving during the installation process. The installation must also provide maximum restraint against operating system pressure without having to supply extra metallic restraints. To provide restraint against operating system pressure and prevent the underdrain from moving during installation, a series of anchor rods, struts, and/or grouting are typically used. However, such installation processes are time consuming and expensive. For example, current installation processes often use a two part grouting process that involves first laying a complete long narrow grout bed for setting and leveling the underdrain laterals, and then using a second grout pour to fill the remaining joints between the undrain laterals. However, it is difficult to get the underdrain laterals aligned and leveled because of the large grout bed which must be displaced. In addition, the second grout pour can form a cold joint which is weak in tension. As such, current underdrain installation processes have various drawbacks. A need, therefore, exists for an installation process for a filter underdrain system that overcomes the drawbacks associated with current methods.

SUMMARY OF THE INVENTION

In one embodiment according to the present invention, a method of installing a filter underdrain system includes: positioning a grout pad on a filter floor; positioning an underdrain block onto the grout pad such that the grout pad is displaced when the underdrain block is positioned on the grout pad; and inserting filler grout around the underdrain block. The displaced grout pad is below the top wall of the underdrain block. The filler grout is prevented from extending over the top wall of the underdrain block. The method can also include marking a portion of the filter floor where the grout pad will be positioned and leveling the underdrain block on the grout pad before inserting filler grout. The grout pad can be made of cement, sand, water, or a mixture thereof. In certain embodiments, the grout pad is formed from a ratio of sand to cement in the range of 3:1 to 2:1. Further, the length of the underdrain block can be longer than the length of the grout pad.

In certain embodiments, the underdrain block can include a grout chamber. The filler grout can fill the grout chamber of the underdrain block. The filter underdrain system can be free of struts. The filter underdrain system can also be free of anchor rods, except over channels in the filter floor.

In certain embodiments, two or more grout pads are positioned on the filter floor. In some of these embodiments, the underdrain block is positioned over the two or more grout pads. In other embodiments, two or more underdrain blocks are positioned over the two or more grout pads. In some embodiments, two or more underdrain blocks are positioned over each individual grout pad.

DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 1:
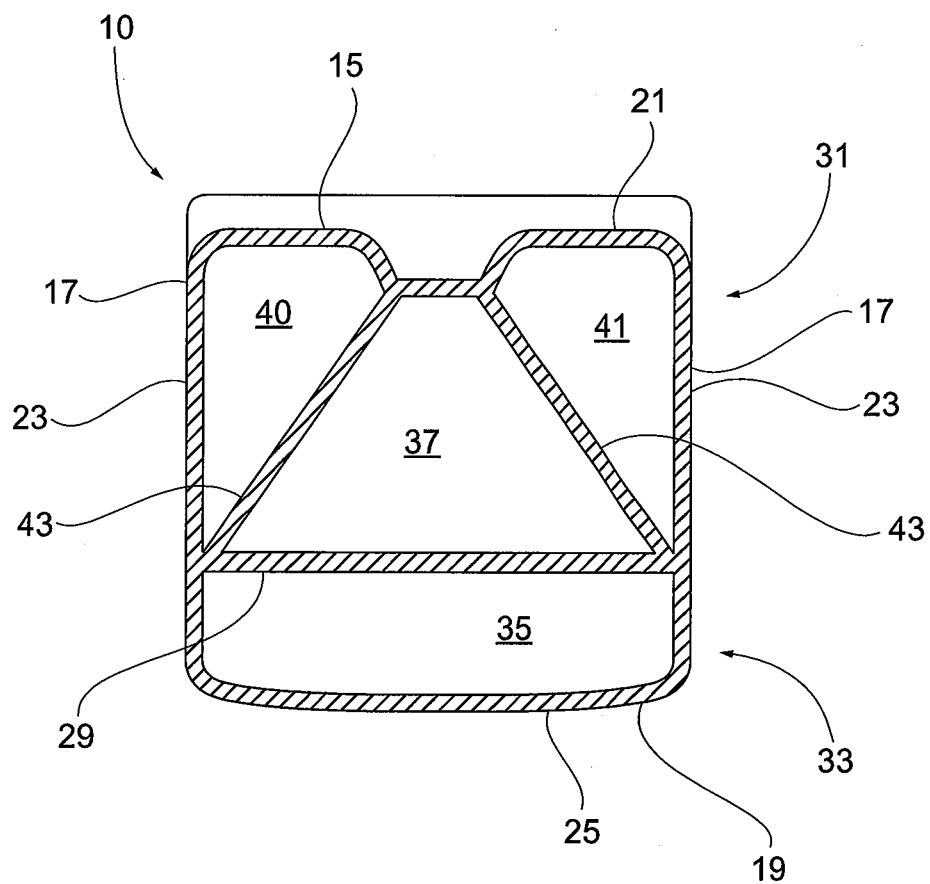
FIG. 1 is a front view of an underdrain block according to one embodiment of the present invention.

As indicated, the present invention is directed to a grout support installation method for a filter underdrain system. In certain embodiments, as shown in FIG. 1, the filter underdrain system includes an underdrain block 10 having a top wall 15, a pair of side walls 17, and a bottom wall 19, which define a top surface 21, side surfaces 23, and a bottom surface 25, respectively. As further shown in FIG. 1, a transverse interior wall 29 can extend from one side wall 17 to the other side wall 17 to divide the interior of block 10 into an upper portion 31 and a lower portion 33. The top wall 15 defines a recessed portion that extends along a longitudinal axis of the block 10. The side walls 17 are generally planar, although the side walls 17 may include recessed portions such that the width of the block 10 in cross-section is narrower in certain areas. The ends of the block 10 are configured to receive respective ends of adjacent blocks so that a plurality of underdrain filter blocks may be secured end-to-end to form an underdrain lateral.

Referring again to FIG. 1, in certain embodiments, the lower portion 33 of the block 10 includes a grout chamber 35 defined by the transverse wall 29, side walls 17, and bottom wall 19. The grout chamber 35 is open at each end of the block 10, although the chamber 35 may be closed at one or both ends. The grout chamber 35 extends longitudinally along the full length of the block 10, although the chamber 35 may have a length shorter than the full length of the block 10. The upper portion 31 of the block 10 includes a primary chamber 37 and a pair of secondary chambers 40, 41 defined by a pair of angularly extending walls 43. Rather than providing the substantially planar angularly extending walls 43, the interior walls that define the primary chamber 37 and the secondary chambers 40, 41 may be arched or curved. The top wall 15 and the angularly extending walls 43 define a plurality of orifices (not shown) to provide for the distribution of liquid and gas as known in conventional underdrain blocks.

Figure 2:
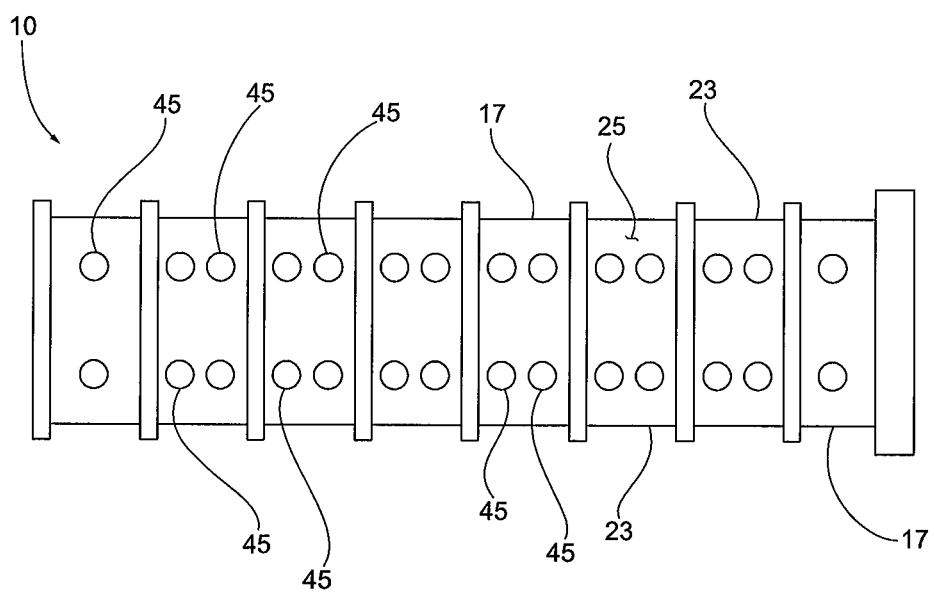
FIG. 2 is a bottom view of the underdrain block shown in FIG. 1.
Figure 3:
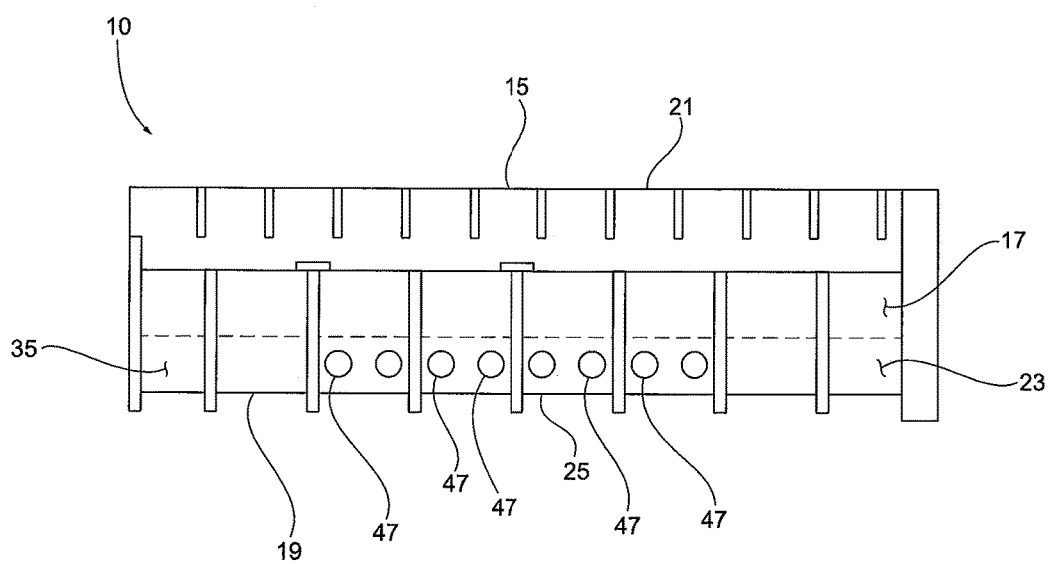
FIG. 3 is a side view of the underdrain block shown in FIG. 1.

As shown in FIGS. 2 and 3, the underdrain block 10 can have a plurality of openings 45 that extend into the grout chamber 35. Each of the side walls 17 also define a plurality of openings 47 in the lower portion 33 of the block 10 with the openings 47 extending into the grout chamber 35. The openings 47 in the side walls 17 are not provided for the full length of the block 10, but may be provided for the full length of the block 10 in other configurations. Although the side walls 17 and bottom wall 19 include openings 45, 47, the side walls 17 or bottom wall 19 may alternatively not include openings. Further, the side walls 17 and the bottom wall 19 may not be provided with openings that extend into the grout chamber 35. In such an arrangement, the block 10 may be provided with a grout introduction scoop (not shown) that is in fluid communication with the grout chamber 35. Furthermore, the openings 45, 47 may be substantially circular-shaped, but may have other configurations such as being oblong-shaped, square-shaped, or any other suitable shape. Further details of filter underdrain systems that can be used with the present invention are described in U.S. Patent Application Publication Nos. 2011/0174719 and 2013/0199990, which are incorporated by reference in their entirety.

Figure 4:
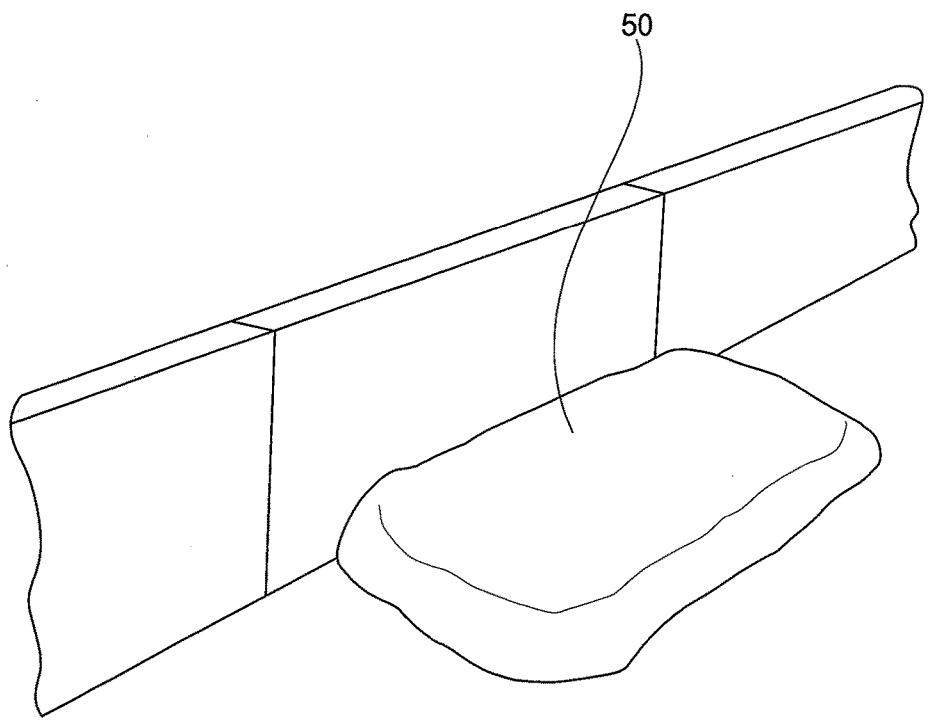
FIG. 4 is perspective view of a grout pad positioned on a filter floor according to one embodiment of the present invention.

Referring to FIG. 4, and in accordance with one embodiment of the present invention, a process of installing a filter underdrain system can include positioning a grout pad 50 onto a filter floor. To ensure proper placement of the grout pad 50, a portion of the filter floor can be marked such as by striking lines where the grout pad is to be placed. As used herein, "grout" refers to a flowable material that can include a mixture of a liquid, such as water, and a dry particulate material, such as cement. The cement can be standard brand Portland cement conforming to ASTM C150, Type II. In certain embodiments, the grout is mixed with other materials including, but not limited to, sand. For example, the grout pad 50 can comprise a ratio of sand to cement in the range of 3:1 to 2:1, and ratio of water to cement in the range of 0.45:1 to 0.70:1. Non-limiting examples of sand that can be used to prepare the grout pad include clean and washed masonry sand per ASTM C144, and when tested in accordance with ASTM C144, 100% of sand particles passes No. 4 Sieve (4.75 mm) and not more than 4% of sand particles passes No. 200 Sieve (0.075 mm).

Figure 5:
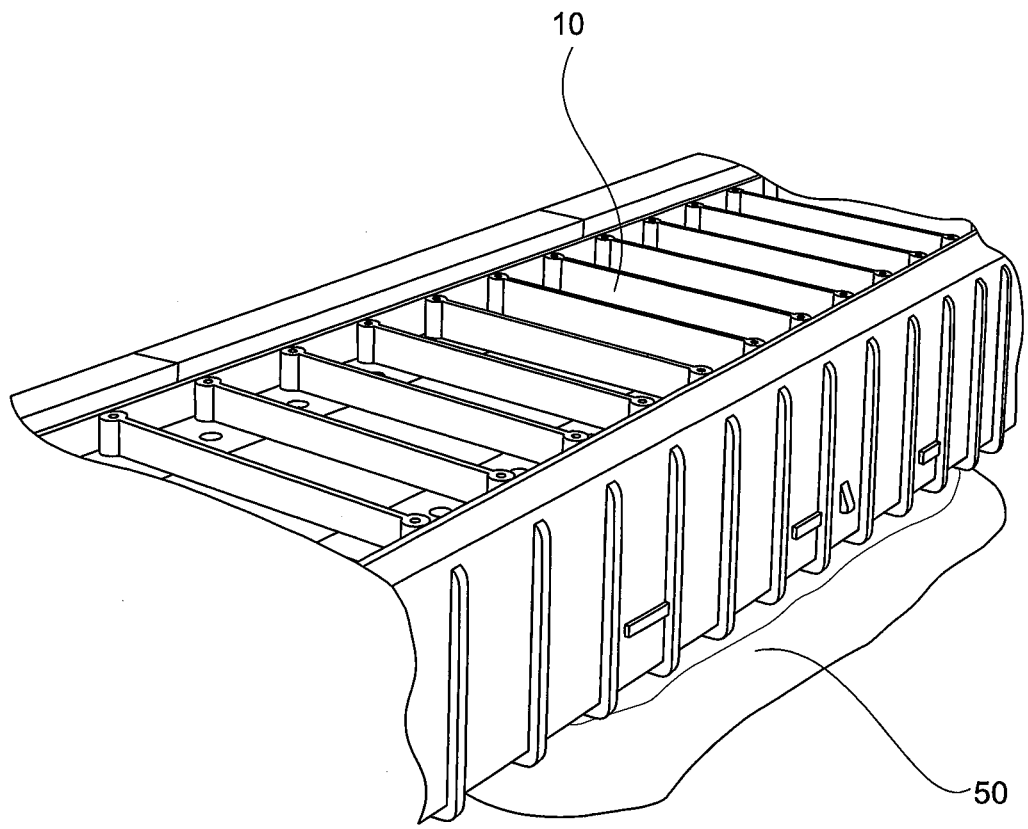
FIG. 5 is perspective view of an underdrain block positioned on the grout pad of FIG. 4.

The grout pad 50 can also be formed into various shapes and sizes. As shown in FIG. 4, the grout pad can be formed into a rectangular shape. However, the shape of the grout pad 50 is not limited and the grout pad 50 can be formed into various shapes to support different types of underdrain blocks 10. Further, the grout pad 50 can be sized so that the pad 50 will be displaced when an underdrain block 10 is placed on top, as shown in FIG. 5. In certain embodiments, the length of the grout pad 50 is shorter than the length of the underdrain block 10. In some of these embodiments, the length of the grout pad 50 is less than half the length of the underdrain block (i.e. less than 50% of the length of the underdrain block 10). Further, in certain embodiments, the width of the grout pad 50 is the same width of the underdrain block 10. The size of the grout pad 50 allows it to be displaced more easily. As used herein, "displaced" refers to the movement of a portion of the grout pad 50 from its original shape and size. The displacement of the grout pad 50 allows an underdrain block 10 to be positioned, leveled, and secured on top of the grout pad 50 during installation of the filter underdrain system.

In some embodiments, there can be two or more grout pads 50 where one underdrain block 10 is placed. The grout pads 50 can be spaced apart or they can be positioned next to each other such that a portion of the grout pads 50 are in direct contact. The number and size of grout pads 50 will vary depending on the type of underdrain blocks 10 that are used with the filter underdrain system.

After the grout pad 50 is prepared and positioned onto the filter floor, an underdrain block 10 may be placed on top of the grout pad 50, as shown in FIG. 5. As described above, the grout pad 50 will be displaced when the underdrain block 10 is placed on top. For example, referring to FIG. 5, a portion of the grout pad 50 can expand out past the side walls 17 of the underdrain 10 after the underdrain 10 is placed onto the grout pad 50. The displacement of the grout pad 50 allows for easier alignment and leveling of the underdrain block 10 on top of the grout pad 50. Other materials can be used to assist in aligning and leveling the underdrain block 10 on the grout pad 50. For example, shims can be used to help in the leveling of the underdrain block 50. The location of the grout pad 50 or pads 50 along the length of the underdrain block 10 helps secure the underdrain block 10 in place during the installation process. The location of the grout pad 50 or pads 50 along the length of the underdrain block 10 also contributes to the overall strength of the installation.

Figure 6:
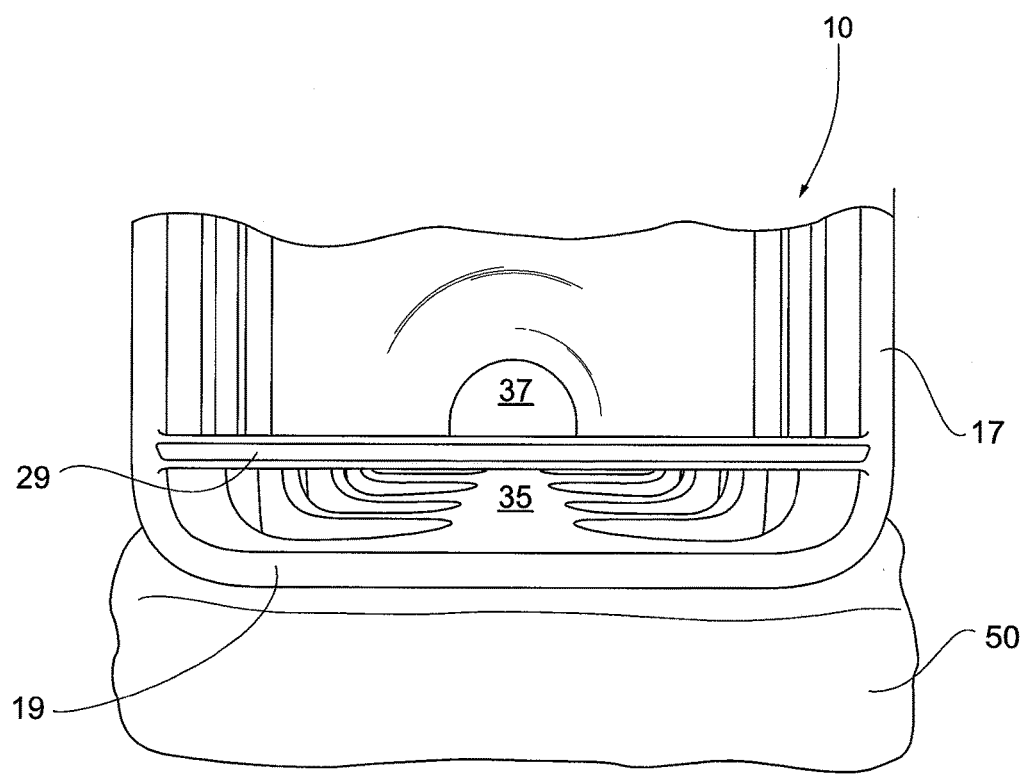
FIG. 6 is a front view of a grout chamber of an underdrain block positioned on a grout pad according to one embodiment of the present invention.
Figure 7:
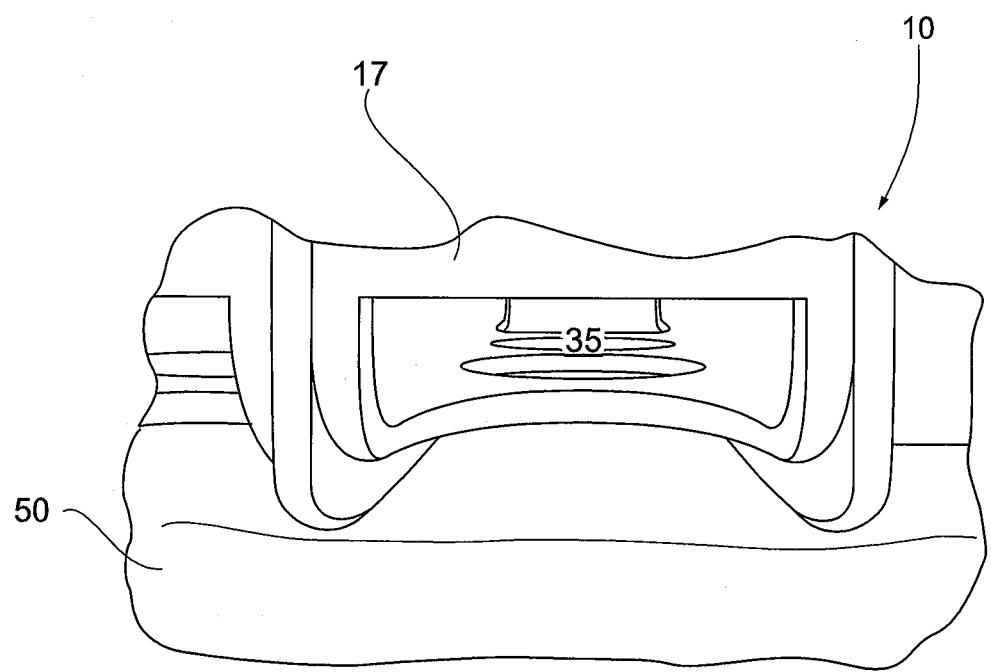
FIG. 7 is a side view of a grout chamber of an underdrain block positioned on a grout pad according to one embodiment of the present invention.

Once the underdrain block 10 is placed onto the grout pad 50, a fill grout can be poured into the filter to fill gaps under and around the underdrain block 10. In one embodiment, a space is formed between the underdrain block 10 and a side wall positioned on the filter floor where fill grout can flow around and under the underdrain block 10. As shown in FIGS. 6 and 7, when the underdrain block 10 contains a grout chamber 35, the grout chamber 35 is free of grout after the underdrain block 10 is aligned and leveled on the grout pad 50. The fill grout fills the grout chamber 35 of the underdrain block 10 to provide maximum installation strength to the filter underdrain system. As used herein, "fill grout" refers to a grout material that can easily flow around the underdrain block 10 while still providing maximum installation strength when dried. The fill grout can be made of the same material as the grout pad or it can be made of a different material or a different ratio of materials.

By using a small grout pad 50 to install a filter underdrain system in accordance with the methods described herein, the use of additional anchor rods and struts is avoided, except for anchor rods over channels in the filter floor. As a result, the filter underdrain system can be free of additional materials such as anchor rods (except over channels in the filter floor) and struts. Further, the alignment and leveling of the underdrain blocks 10 is easier and faster than other installation methods. The overall installation strength is also improved by using small grout pads 50 and pouring grout into spaces around the underdrain blocks 10.

Figure 8:
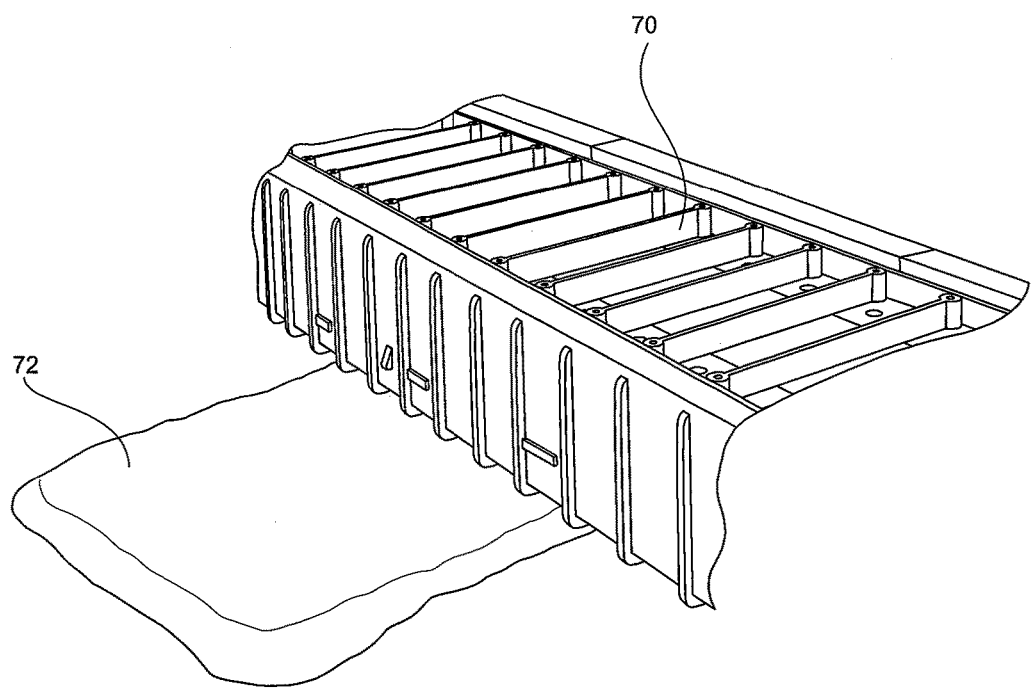
FIG. 8 is a perspective view of a filter underdrain system having a second grout pad for a second underdrain block according to one embodiment of the present invention.
Figure 9:
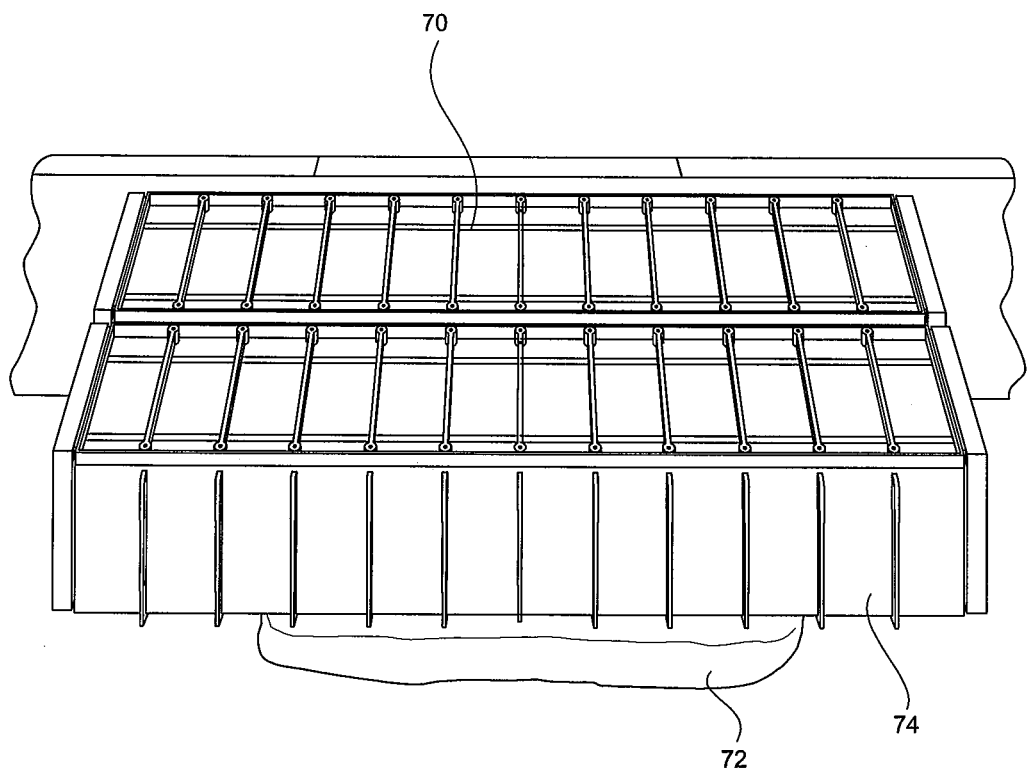
FIG. 9 is a perspective view of the filter underdrain system shown in FIG. 8 with a second underdrain block positioned on the second grout pad.

In certain embodiments, multiple grout pads 50 are used to install two or more separate underdrain blocks 10. In one embodiment, as shown in FIGS. 8 and 9, a first underdrain block 70 is placed onto a grout pad 50 positioned on a filter floor. A second grout pad 72 is positioned next to the first grout pad 50 where a second underdrain block 74 can be placed. The positioning and number of grout pads 50, 72 used to support and secure the underdrain blocks 70, 74 will vary. For instance, one or more grout pads 50, 72 having the same or different size can be used to install each underdrain block 70, 74. The number, size, and positioning of each grout pad 50, 72 is chosen to provide proper leveling and alignment of each underdrain block 70, 74 on the filter floor. When the underdrain blocks 70, 74 contain a grout chamber 35, the grout chamber 35 is free of grout after the underdrain blocks 70, 74 are aligned and leveled on the grout pads 50, 72. Thus, the material of the grout pads 50, 72 does not flow into the grout chamber 35.

Figure 10:
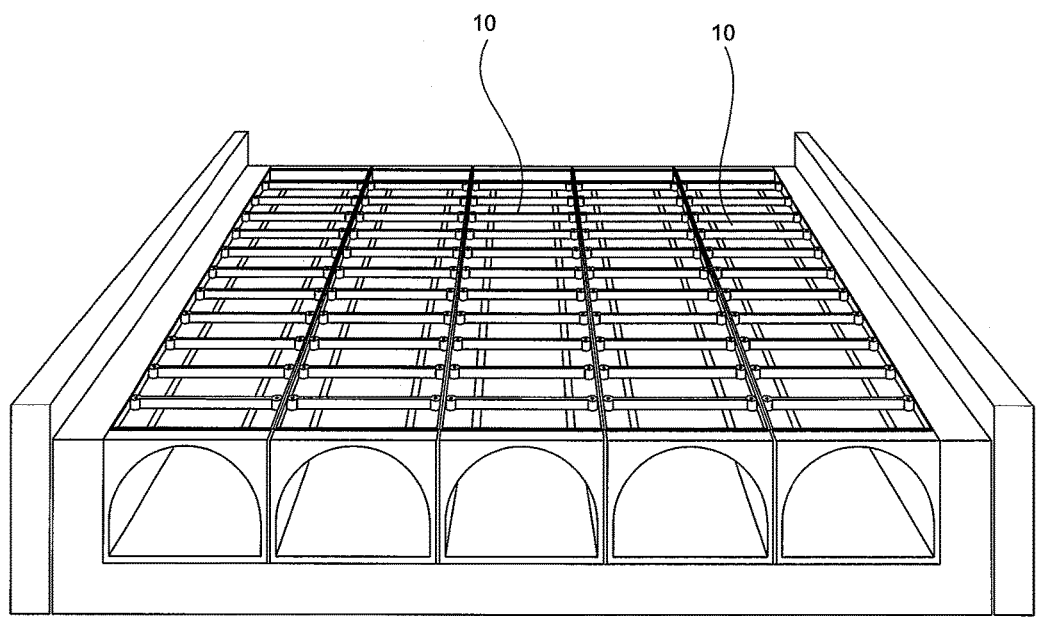
FIG. 10 is a perspective view of an installed filter underdrain system having multiple underdrain blocks according to one embodiment of the present invention.

After the underdrain blocks 70, 74 are positioned on their respective grout pads 50, 72, fill grout can be poured into the filter as described above. The fill grout will flow around, between, and under each underdrain block 70, 74 as well as between spaces between the underdrain blocks 70, 74 and side walls on the filter floor. In one embodiment where the underdrain blocks 70, 74 have a grout chamber 35, the fill grout will flow within the grout chamber 35 to provide maximum installation strength for each underdrain block 70, 74 of the filter underdrain system. FIG. 10 illustrates an installed filter underdrain system having multiple underdrain blocks 10 in accordance with one embodiment of the present invention.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A method of installing a filter underdrain system comprising:
    (a) positioning a plurality of grout pads on a filter floor;
    (b) positioning an underdrain block onto at least one of the grout pads such that the at least one grout pad is displaced when the underdrain block is positioned on the at least one grout pad, the underdrain block comprising a top wall, a bottom wall, a pair of side walls connecting the top wall and bottom wall, at least one interior wall that forms a primary chamber and at least one secondary chamber in an interior portion of the underdrain block, and a grout chamber positioned below the interior wall of the underdrain block, wherein the displaced grout pad is below the top wall of the underdrain block; and
    (c) inserting filler grout around the underdrain block such that the filler grout is prevented from extending over the top wall of the underdrain block,
    wherein the grout chamber is substantially free of grout after the underdrain block is aligned and leveled on the grout pad,
    wherein at least two of the grout pads are arranged such that a portion of the two grout pads are in direct contact.

2. The method of claim 1, further comprising marking a portion of the filter floor where at least one of the grout pads will be positioned.

3. The method of claim 1, wherein at least one of the grout pads comprises cement, sand, water, or a mixture thereof.

4. The method of claim 3, wherein at least one of the grout pads comprises a ratio of sand to cement in the range of 3:1 to 2:1.

5. The method of claim 1, wherein a length of the underdrain block is longer than a length of at least one of the grout pads.

6. The method of claim 1, wherein the filler grout fills the grout chamber of the underdrain block.

7. The method of claim 1, wherein the filter floor comprises channels, and wherein the filter underdrain system is free of anchor rods, except over the channels in the filter floor.

8. The method of claim 1, wherein the filter underdrain system is free of struts.

9. The method of claim 1, wherein the underdrain block is positioned over the at least two grout pads.

10. The method of claim 1, wherein two or more underdrain blocks are positioned over each individual grout pad.

11. A method of installing a filter underdrain system consisting essentially of:
    (a) positioning a plurality of grout pads on a filter floor;
    (b) positioning an underdrain block onto at least one of the grout pads such that the at least one grout pad is displaced when the underdrain block is positioned on the at least one grout pad, the underdrain block comprising a top wall, a bottom wall, a pair of side walls connecting the top wall and bottom wall, at least one interior wall that forms a primary chamber and at least one secondary chamber in an interior portion of the underdrain block, and a grout chamber positioned below the interior wall of the underdrain block, wherein the displaced grout pad is below the top wall of the underdrain block; and
    (c) inserting filler grout around the underdrain block such that the filler grout is prevented from extending over the top wall of the underdrain block,
    wherein the grout chamber is substantially free of grout after the underdrain block is aligned and leveled on the grout pad,
    wherein at least two of the grout pads are arranged such that a portion of the two grout pads are in direct contact.

* * * * *